(12) United States Patent
Setmire et al.

(10) Patent No.: US 10,073,218 B2
(45) Date of Patent: Sep. 11, 2018

(54) METALIZED DOUBLE-CLAD OPTICAL FIBER

(71) Applicant: Massachusetts Institute of Technology, Cambridge, MA (US)

(72) Inventors: Zachary J. Setmire, Cambridge, MA (US); John J. Zayhowski, Cambridge, MA (US); Jonathan Wilson, Hampstead, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/470,661

(22) Filed: Mar. 27, 2017

(65) Prior Publication Data

US 2017/0276869 A1 Sep. 28, 2017

Related U.S. Application Data

(60) Provisional application No. 62/313,870, filed on Mar. 28, 2016.

(51) Int. Cl.
*G02B 6/036* (2006.01)
*G02B 6/44* (2006.01)

(52) U.S. Cl.
CPC ............ *G02B 6/036* (2013.01); *G02B 6/4402* (2013.01); *G02B 6/443* (2013.01); *G02B 6/4415* (2013.01); *G02B 6/4488* (2013.01)

(58) Field of Classification Search
CPC .................. C03C 25/108; G02B 6/03694
See application file for complete search history.

(56) References Cited

U.S. PATENT DOCUMENTS 4,390,589 A * 6/1983 Geyling ................ C03C 25/104
359/900
4,418,984 A * 12/1983 Wysocki ............... C03C 25/107
385/127

(Continued)

FOREIGN PATENT DOCUMENTS

WO WO2002041054 A1 5/2002

OTHER PUBLICATIONS

"Metal-coated fibres, double-cladding designs and more," Nature Photonics, vol. 5, Aug. 2011, p. 473.

(Continued)

*Primary Examiner* — Rhonda Peace
(74) *Attorney, Agent, or Firm* — Smith Baluch LLP (57) ABSTRACT

Double-clad optical fibers with polymer outer coatings are used in fiber amplifiers and fiber lasers to guide and amplify light. As the optical power increases, the optical fibers must dissipate more heat. Unfortunately, it is difficult to dissipate heat through a polymer cladding, especially at high altitude, without introducing phase noise in the optical signal. To overcome this problem, the inventors have realized metalized polymer-clad optical fibers with superior heat dissipation characteristics than conventional polymer-clad optical fibers. An example metallized polymer-clad optical fiber includes a thin chrome layer that is vacuum-deposited onto the polymer cladding at low temperature, then electroplated with a thicker copper layer. In operation, the copper layer dissipates heat from within the fiber's core and claddings via a heatsink, enabling the fiber to guide and amplify high-power optical signals at high altitude.

28 Claims, 7 Drawing Sheets

(56) References Cited

U.S. PATENT DOCUMENTS

| | | | | |
|---|---|---|---|---|
| 4,485,122 | A * | 11/1984 | Williams | C03C 25/108 427/163.2 |
| 4,592,932 | A * | 6/1986 | Biswas | C03C 25/104 205/138 |
| 4,673,469 | A * | 6/1987 | Beach | C25D 5/56 205/167 |
| 4,893,895 | A * | 1/1990 | Berthold | F27B 3/085 385/123 |
| 5,093,880 | A * | 3/1992 | Matsuda | C25D 3/38 385/100 |
| 5,093,889 | A * | 3/1992 | Kubo | G02B 6/02033 385/142 |
| 5,100,507 | A | 3/1992 | Cholewa et al. | |
| 5,113,477 | A * | 5/1992 | Eguchi | G02B 6/02033 385/143 |
| 5,117,480 | A * | 5/1992 | Yamamoto | C08K 5/0008 385/145 |
| 5,148,511 | A * | 9/1992 | Savu | C03C 25/105 385/145 |
| 5,153,288 | A * | 10/1992 | Matsunaga | C08F 220/22 428/392 |
| 5,187,770 | A * | 2/1993 | Mishima | G02B 6/02033 385/145 |
| 5,204,435 | A * | 4/1993 | Kozakai | G02B 1/046 428/364 |
| 5,204,930 | A * | 4/1993 | Brandt | G02B 1/046 385/143 |
| 5,206,926 | A * | 4/1993 | Yamamoto | B29C 47/0014 385/102 |
| 5,212,762 | A * | 5/1993 | Shimada | C03C 25/105 385/141 |
| 5,223,561 | A * | 6/1993 | Yamamoto | C08K 5/0008 524/155 |
| 5,237,638 | A * | 8/1993 | Narciso, Jr. | G02B 6/02033 385/123 |
| 5,238,974 | A * | 8/1993 | Yamamoto | B29D 11/00663 385/123 |
| 5,264,288 | A * | 11/1993 | Das | C03C 17/10 427/305 |
| 5,302,316 | A * | 4/1994 | Hashimoto | C03C 25/105 252/183.11 |
| 5,484,822 | A * | 1/1996 | Minns | C08F 220/22 522/35 |
| 5,497,442 | A * | 3/1996 | Roos | G02B 6/4402 385/12 |
| 5,898,715 | A * | 4/1999 | LeGrange | G02B 6/262 372/6 |
| 5,901,264 | A | 5/1999 | Camlibel et al. | |
| 5,908,562 | A | 6/1999 | Ohtsu et al. | |
| 5,940,567 | A * | 8/1999 | Garito | G02B 6/0288 385/127 |
| 5,944,865 | A * | 8/1999 | Do | C03C 25/16 65/381 |
| 5,963,701 | A * | 10/1999 | Nakamura | G02B 1/045 385/102 |
| 6,251,252 | B1 | 6/2001 | Chen | |
| 6,343,173 | B2 * | 1/2002 | Hordvik | G02B 6/4492 385/102 |
| 6,355,301 | B1 * | 3/2002 | Miller | C03C 17/10 427/163.2 |
| 6,470,131 | B1 * | 10/2002 | Horn | C03C 25/105 385/123 |
| 6,625,363 | B2 * | 9/2003 | Carter | C03C 25/101 359/341.1 |
| 6,798,963 | B2 * | 9/2004 | Nemirovsky | C03C 25/108 385/128 |
| 7,063,779 | B2 * | 6/2006 | Onosato | C25D 5/12 205/149 |
| 7,215,860 | B2 | 5/2007 | Engelberth et al. | |
| 7,813,611 | B2 | 10/2010 | Bennett et al. | |
| 8,542,971 | B2 * | 9/2013 | Chatigny | H01S 3/06704 385/134 |
| 2002/0181512 | A1 * | 12/2002 | Wang | G02B 6/4204 372/6 |
| 2002/0191928 | A1 | 12/2002 | Carter et al. | |
| 2003/0039458 | A1 | 2/2003 | Miller | |
| 2003/0059187 | A1 * | 3/2003 | Andrieu | G02B 6/02033 385/127 |
| 2004/0157950 | A1 * | 8/2004 | Hu | C03C 25/106 522/174 |
| 2005/0141836 | A1 | 6/2005 | Peret | |
| 2006/0251370 | A1 | 11/2006 | Onosato et al. | |
| 2006/0263024 | A1 | 11/2006 | Dong et al. | |
| 2007/0195416 | A1 * | 8/2007 | Lazarev | G02B 5/287 359/578 |
| 2008/0192778 | A1 | 8/2008 | Ohsono et al. | |
| 2011/0110625 | A1 * | 5/2011 | Chatigny | G02B 6/3636 385/29 |
| 2017/0276869 | A1 * | 9/2017 | Setmire | G02B 6/036 |
| 2017/0285261 | A1 * | 10/2017 | Miyamoto | C03C 25/1063 |
| 2018/0026415 | A1 * | 1/2018 | Daniel | H01S 3/0405 |

OTHER PUBLICATIONS

ThorLabs, Double-Clad Fiber, https://www.thorlabs.com/newgrouppage9.cfm?objectgroup_id=8950, 1 page, retreived Apr. 5, 2017.

Dini, J. W. "Electrodeposition," 1st Edition, The Materials Science of Coatings and Substrates, Dec. 31, 1993, 367 pages.

International Search Report and Written Opinion dated Jul. 21, 2017 from International Application No. PCT/US2017/024275, 18 pages.

* cited by examiner

FIG. 3B INSIDE VIEW

FIG. 3A OVERVIEW

METALIZED DOUBLE-CLAD OPTICAL FIBER

CROSS-REFERENCE TO RELATED APPLICATION(S)

This application claims the priority benefit, under 35 U.S.C. § 119, of U.S. Application No. 62/313,870, filed Mar. 28, 2016, and entitled "Metallized Polymer-Coated Optical Fiber." This application is incorporated by reference herein in its entirety.

GOVERNMENT SUPPORT

This invention was made with Government support under Contract No. FA8721-05-C-0002 awarded by the U.S. Air Force. The Government has certain rights in the invention.

BACKGROUND

The high output powers achievable with fiber lasers and amplifiers are largely due to the use of double-clad pumping and the ability of fibers to dissipate large amounts of heat as a result of their large surface-area-to-volume ratio. A conventional double-clad gain fiber includes a glass core surrounded by a glass inner cladding, which in turn is surrounded by a polymer outer cladding. For the active fibers used in high-power kW-class lasers and amplifiers, the core has a typical diameter of about 20 µm and is doped with an active ion, such as $Yb^{3+}$. The glass forming the inner cladding has a slightly lower refractive index than the glass in the core so that the core acts as an optical waveguide for the light being amplified. For high-power applications, the diameter of the inner cladding may be several hundred microns.

The polymer outer cladding has a refractive index that is lower than the refractive index of the inner glass cladding. Typically the outer polymer cladding is several tens of microns thick and protects the fiber from being nicked or broken. The combination of the large diameter of the inner cladding and the difference between its refractive index and that of the polymer outer cladding turns the inner cladding into a "light pipe" capable of capturing and guiding a significant amount (e.g., kilowatts) of pump light from relatively low-intensity pump diodes.

As the pump light within the inner cladding traverses the core, it inverts the active ions in the core and produces optical gain in the fiber. The difference in the wavelength of the pump light and light being amplified results in quantum-defect heating. Quantum-defect heating generates heat at a rate equal to the absorbed pump power times the difference in the energy of a pump photon and a photon at the wavelength being amplified divided by the energy of a pump photon. Quantum-defect heating represents a lower bound to the rate of heat deposition, and in kW-class fiber lasers and amplifiers can approach 100 W $m^{-1}$ of fiber.

With conventional double-clad fibers, the low-index polymer coating is the material most sensitive to a high thermal load. Since it serves the dual purpose of guiding the pump light and protecting the fiber, the materials and thicknesses that can be used are limited. Silicone has been used in the past. It can withstand relatively high temperatures, but suffers from degradation over time. Teflon (polytetrafluoroethylene) is difficult to apply. Although it has been used for passive fibers, the benefits for high-power active fibers have not been demonstrated. The most commonly used materials for the low-index outer cladding in active double-clad fibers are fluorinated acrylates. Fluorinated acrylates are easy to apply during the fiber drawing process and have excellent optical and mechanical properties. However, they have a low thermal conductivity ($k \approx 0.24$ W $m^{-1}$ $K^{-1}$) and degrade quickly at temperatures approaching 200° C. Long-term reliability for fibers with fluorinated acrylate claddings typically requires operation near or below 80° C.

The combination of the high heat load present in kW-class fiber lasers and amplifiers and the poor thermal properties of the polymer outer cladding makes heatsinking of the fiber critical. Conventionally, a high-power fiber is potted with an adhesive that provides the required heatsinking or covered with a thermal compound. As the power of fiber lasers and amplifiers continues to grow, however, the heatsinking provided by adhesives and thermal compounds cannot dissipate heat quickly enough to avoid damaging the optical fiber. Adhesives and thermal compounds also present creep, outgassing, and/or lifetime issues.

It has been suggested that the fibers be immersed in water (or other fluids) or embedded in bulk metal for heatsinking. Unfortunately, embedding a fiber in bulk metal is often not suitable for optical amplifiers used in coherent beam combining, which offers the potential to reach power levels and optical brightnesses that are otherwise unachievable with fiber lasers and amplifiers. For coherent optical beam combining, the phase noise on the output of the individual fibers should be kept low. Rigidly or semi-rigidly attaching the fiber to the heatsink (e.g., by embedding the fiber in the heatsink) provides a strong coupling of platform vibration and acoustics to the fibers, resulting in an unacceptable level of vibration-induced phase noise for coherent optical applications. (Even thermal compounds conventionally used for heatsinking are more rigid than is desired for such applications.) Immersing a fiber in fluid can introduce material compatibility issues, severely limit optical amplifier designs, and impose environmental constraints. Immersion or embedding also increases the size and weight of the system, making it less suitable for certain applications, including airborne applications.

For coherent optical applications, the best heatsinking achieved to date is obtained by creating a line contact (possibly two) between the fiber and the heatsink and designing the heatsink so that there is only a thin air layer between the fiber and the heatsink at other points on the fiber's surface. The thermal path through the air is a significant contribution to the thermal connectivity between the fiber and the heatsink. Typically, such a heatsink is implemented as a block of thermally conductive material (e.g., metal) with a U-shaped groove. The fiber is laid in the U-shaped groove and can slide back and forth within the U-shaped groove.

At sea level, when the optical fiber is placed in a reasonably tight U-shaped groove in a metal heatsink, the heat load in the fiber can be up to about 40 W per meter without the fiber overheating, corresponding to a typical output power of about 1.5 kW. At high altitudes, where there is less air, or for space-based application, the output power of the fibers may be much more limited. But for many of these applications, it is desirable to operate the individual fibers at output powers well in excess of 1.5 kW. Unfortunately, conventional polymer-clad fibers cannot operate at these optical power levels because there is not a suitable way to dissipate heat from the polymer claddings.

SUMMARY

Embodiments of the present technology include an optical fiber comprising a core, an inner cladding disposed about the core, an outer cladding disposed about the inner cladding and comprising a polymer (e.g., a fluoroacrylate), and at least one metal layer disposed about the outer cladding. In some cases, the core is doped with a rare-earth ion, such as $Yb^{3+}$.

There may be multiple metal layers, including a first metal layer disposed about the outer cladding and a second metal layer disposed about the first metal layer. The first metal layer can have a thickness of about 10 nm to about 100 nm, and the second metal layer can have a thickness of about 1 µm to about 100 µm. The first metal layer can comprise chrome, nickel, and/or titanium, and the second metal layer can comprise copper, gold, silver, and/or aluminum. The first metal layer may be vacuum-deposited onto an outer surface of the outer cladding, with at least a portion of the second metal layer electroplated onto an outer surface of the first metal layer. There may also be a third metal layer, disposed about the second metal layer, to prevent oxidation and/or corrosion of the second metal layer.

Other embodiments include methods of metallizing an optical fiber with a polymer outer cladding. One example of these embodiments includes vacuum depositing a first metal layer onto an outer surface of the polymer outer cladding, with the first metal layer adhering to the polymer outer surface of the polymer outer cladding. A second metal layer is electroplated about the first metal layer. The first metal layer can comprise chrome, nickel, and/or titanium and can have a thickness of about 10 nm to about 100 nm. The second metal layer can comprise copper, gold, silver, and/or aluminum and may have a thickness of about 1 µm to about 100 µm.

Some examples of these methods further include vacuum depositing a third metal layer onto an outer surface of the first metal layer and forming the second metal layer on an outer surface of the third metal layer. In these examples, the third metal layer can comprise copper, gold, silver, and/or aluminum and can have a thickness of about 100 nm to about 1000 nm.

These methods may also include passivating an outer surface of the second metal layer. For instance, passivating may be accomplished at least in part by depositing a layer of chrome, nickel, and/or titanium onto an outer surface of the second metal layer and/or by forming a polymer outer layer about the second metal layer.

Yet another embodiment includes an optical fiber comprising a quartz core, a quartz cladding, a fluoroacrylate cladding, a first metal layer, and a second metal layer. The quartz core is doped with a rare-earth ion and has a first effective refractive index. The quartz cladding is disposed about the quartz core and has a second effective refractive index less than the first effective refractive index. The fluoroacrylate cladding is disposed about the quartz cladding and has a third effective refractive index less than the second effective refractive index. The first metal layer is disposed about the fluoroacrylate cladding and includes chrome, nickel, and/or titanium. And the second metal layer is disposed about the first metal layer and includes copper, gold, silver, and/or aluminum. The first metal layer may have a thickness of about 1 nm to about 100 nm, and the second metal layer may have a thickness of about 1 µm to about 100 µm. The optical fiber may further include a third metal layer disposed about the second metal layer to prevent oxidation and/or corrosion of the second metal layer.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Embodiments of the present technology provide heatsinking of high-power, polymer-clad optical fibers without mechanically coupling the fiber to the heatsink. More specifically, a thin coating of high-thermal-conductivity metal, such as copper (thermal conductivity $k=400$ W m$^{-1}$ K$^{-1}$), is coated onto a polymer-clad optical fiber, which is placed on or in a heatsink (e.g., in a U-shaped groove in a metal heatsink). A line contact between the metal coating and the heatsink effectively heatsinks the polymer outer cladding at all points on its surface. The thickness of the metal coating (in the case of copper or other high-thermal-conductivity metals including gold [k=300 W m$^{-1}$ K$^{-1}$], silver [k=400 W m$^{-1}$ K$^{-1}$], or aluminum [k=200 W m$^{-1}$ K$^{-1}$]) is typically about 10 µm, which is small enough that the metal layer does not severely compromise the desirable mechanical properties of the fiber, including its flexibility and resilience.

Because of the high thermal conductivity of the metal coating, small gaps in the line contact between the fiber and its heatsink do not have a significant impact on the temperature profile of the fiber. The fiber can bridge trenches or gaps in the metal heatsink several times the fiber diameter, which is not possible in the high-gain part of a conventional high-power fiber laser or amplifier. This adds additional flexibility to the system design and simplifies construction.

The metal coating can also serve part of the protective function currently provided by the polymer coating. The polymer coating can therefore be thinner, which results in less thermal impedance between the inner glass cladding and the heatsink and reduces the temperature throughout the fiber. Conventional high-power gain fibers use a polymer coating that is about 50 to 80 µm thick; coatings as thin as 20 µm have been demonstrated to provide the desired optical characteristics.

Finally, the metal coating may result in an increase in the threshold for multimode instabilities (MMI), which limit the maximum single-transverse-mode output power that can be obtained from a conventional large-mode-area (LMA) fiber. MMI results from a thermal grating induced by the beating of the fundamental and higher-order modes in LMA fibers. The grating period is typically on the order of a millimeter or two. The high thermal conductivity of the metal coating "short circuits" the thermal grating and reduces its strength, thus pushing the MMI threshold higher.

A Metallized Polymer-Clad Optical Fiber in a Heatsink

Figure 1A:
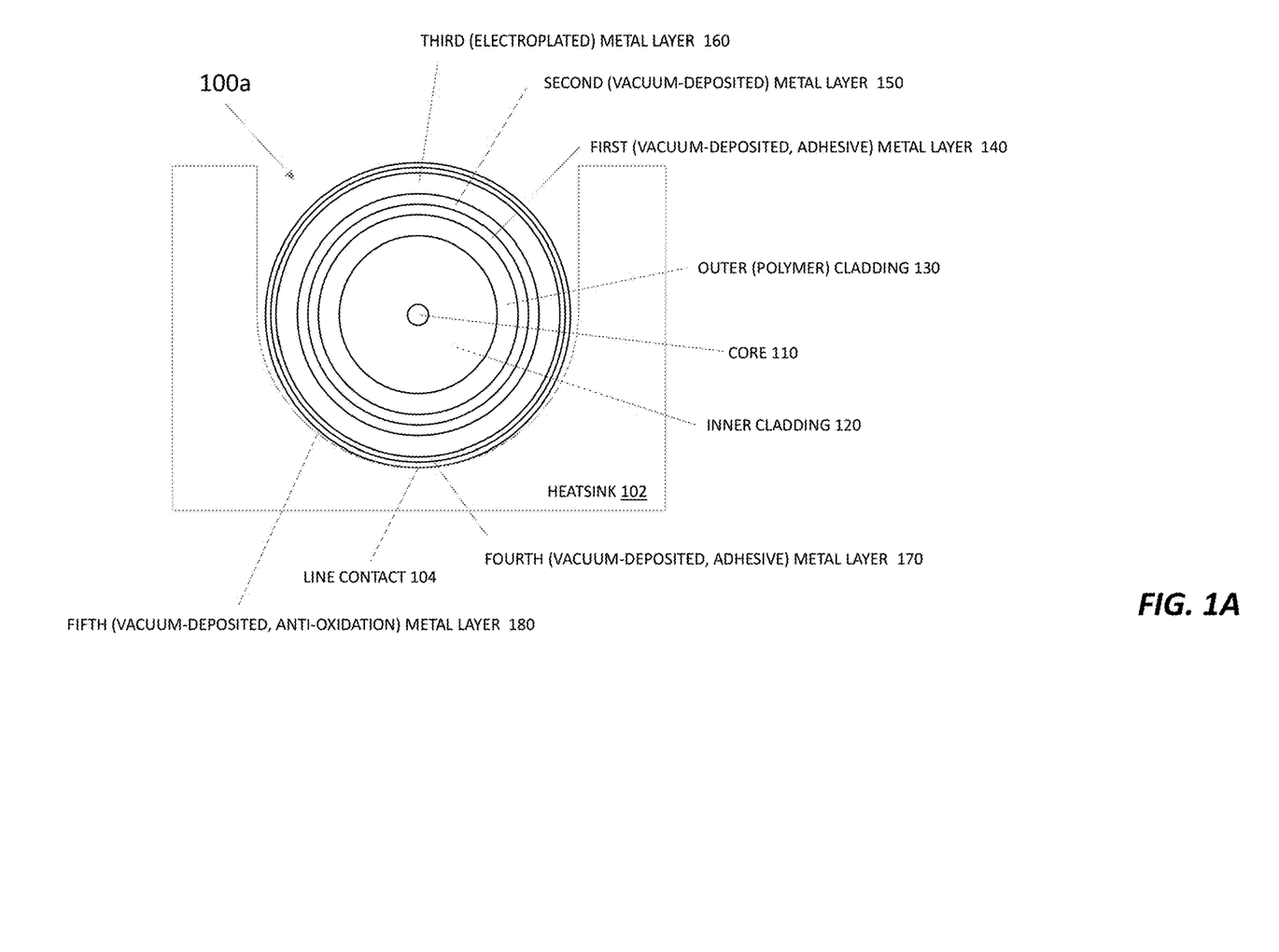
FIG. 1A shows a metallized, polymer-clad optical fiber that can operate at higher optical powers and with higher heat loads than conventional optical fibers.

FIG. 1A shows a cross section of a metallized polymer-clad optical fiber 100a disposed in a heatsink 102. The fiber 100a includes a core 110 made of silica or any other suitable material. The core 110 is surrounded by an inner cladding 120 that is made of silica or another suitable material whose effective refractive index is lower than that of the core. Typically, the core 110 has an effective refractive index n=1.4 to 1.5. The inner cladding's effective refractive index is lower than the core's effective refractive index, e.g., by about Δn=0.01 to 0.1, so the core 110 will guide signal light at the signal wavelength. The core 110 and the inner cladding 120 may be doped with Ge, Al, P, B, or F to control their refractive indices. The core 110 is usually doped with at least some of these elements, whereas the inner cladding 120 is often made of pure silica (quartz). The core 110 may also be doped with optically active rare-earth ions, such as Yb$^{3+}$ or Er$^{3+}$, to provide gain at the signal wavelength.

The inner cladding 120 is surrounded by a polymer outer cladding 130. The polymer outer cladding's effective refractive index is lower than the inner cladding's refractive index so that the inner cladding 120 guides pump light at a pump wavelength. The polymer outer cladding 130 may be formed of a fluorinated acrylate (fluoroacrylate), Teflon, or any other suitable material. The core 110, inner cladding 120, and outer cladding 130 typically have diameters of about 20-25 µm, 400 µm, and 500 µm diameter, respectively.

Unlike conventional polymer-clad optical fibers, the metallized polymer-clad optical fiber 100a also includes a multi-layer metal coating disposed around the polymer outer cladding 130. This multi-layer metal coating dissipates heat from the core 110, inner cladding 120, and polymer outer cladding 130. It also protects them from being nicked, scratched, or broken. And it provides a thermal path that makes it possible to bridge gaps between adjacent heatsinks, for example.

In the example shown in FIG. 1A, the multi-layer metal coating includes five layers:
 a relatively thin vacuum-deposited first metal layer 140 disposed around an outer surface of the polymer outer cladding 130;
 a slightly thicker vacuum-deposited second metal layer 150 disposed around an outer surface of the first metal layer 140;
 a much thicker electroplated third metal layer 160 disposed around an outer surface of the second metal layer 150;
 a relatively thin vacuum-deposited fourth metal layer 170 disposed around an outer surface of the third metal layer 160; and
 a relatively thin fifth metal layer 180 disposed around an outer surface of the fourth metal layer 170.

The first metal layer 140 is a "sticky" or adhesive material that serves as a base for creating the multi-layer coating. It adheres to the polymer outer cladding 130 and can be vacuum deposited without unduly heating the bulk of the polymer outer cladding 130. (Depositing the first metal layer 140 may heat outer portions of the polymer outer cladding 130, but not to the point of damage.) It may be about 10 nm to about 100 nm thick—thick enough to substantially coat the outer surface of the polymer outer cladding 130 but not so thick that deposition damages the polymer outer cladding 130. The first metal layer 140 comprises chrome, nickel, titanium, or any other material that adheres well to the polymer outer cladding 130. It does not need to have high thermal conductivity because it is so thin and because it is surrounded by one or more layers with high thermal conductivity.

The second metal layer 150 acts as a seed layer for electroplating the third metal layer 160. The second metal 150 is a metal with an electrical conductivity high enough to be electroplated, such as copper, gold, silver, or aluminum. (The second metal layer 150 may be omitted if the first metal layer 140 has a high enough electrical conductivity to be electroplated.) The second metal layer 150 is typically about 100 nm thick to about 1000 nm thick (e.g., 500 nm thick), which is thin enough to avoid unduly heating the polymer outer cladding 130 during deposition and thick enough to avoid a large voltage drop along the length of the fiber 100a in the electroplating bath during the electroplating process. The exact thickness may be selected based on the material conductivity and the length of fiber in the electroplating bath.

The third metal layer 160 serves to dissipate heat propagating or generated in the core 110, inner cladding 120, or polymer outer cladding 130. It is electroplated onto the outer surface of the second metal layer 150 (or the first metal layer 140 if the second metal layer 150 is omitted). It comprises a metal with a thermal conductivity greater than about 50 W m$^{-1}$K$^{-1}$, such as copper, gold, silver, or aluminum. And its thickness may be about 1 µm to about 100 µm (e.g., 5 µm, 10 µm, 20 µm, or 50 µm). In some cases, the second metal layer 150 and the third metal layer 160 are made of the same material (e.g., copper) and may appear to the naked eye as a single layer. Nevertheless, they may be distinguishable under optical magnification or when viewed with a scanning electron microscope.

The outer surface of the third metal layer 160 may be passivated, or made unreactive, to prevent oxidation or corrosion. In the optical fiber 100a shown in FIG. 1A, the third metal layer's outer surface is passivated by a relatively thin inert metal layer 180 made of gold or another suitable inert metal. This inert metal layer 180 is plated onto a thin layer 170 of adhesive metal, such as chrome, nickel, or titanium, that is deposited on the third metal layer's outer surface.

Figures 1B, 1C:
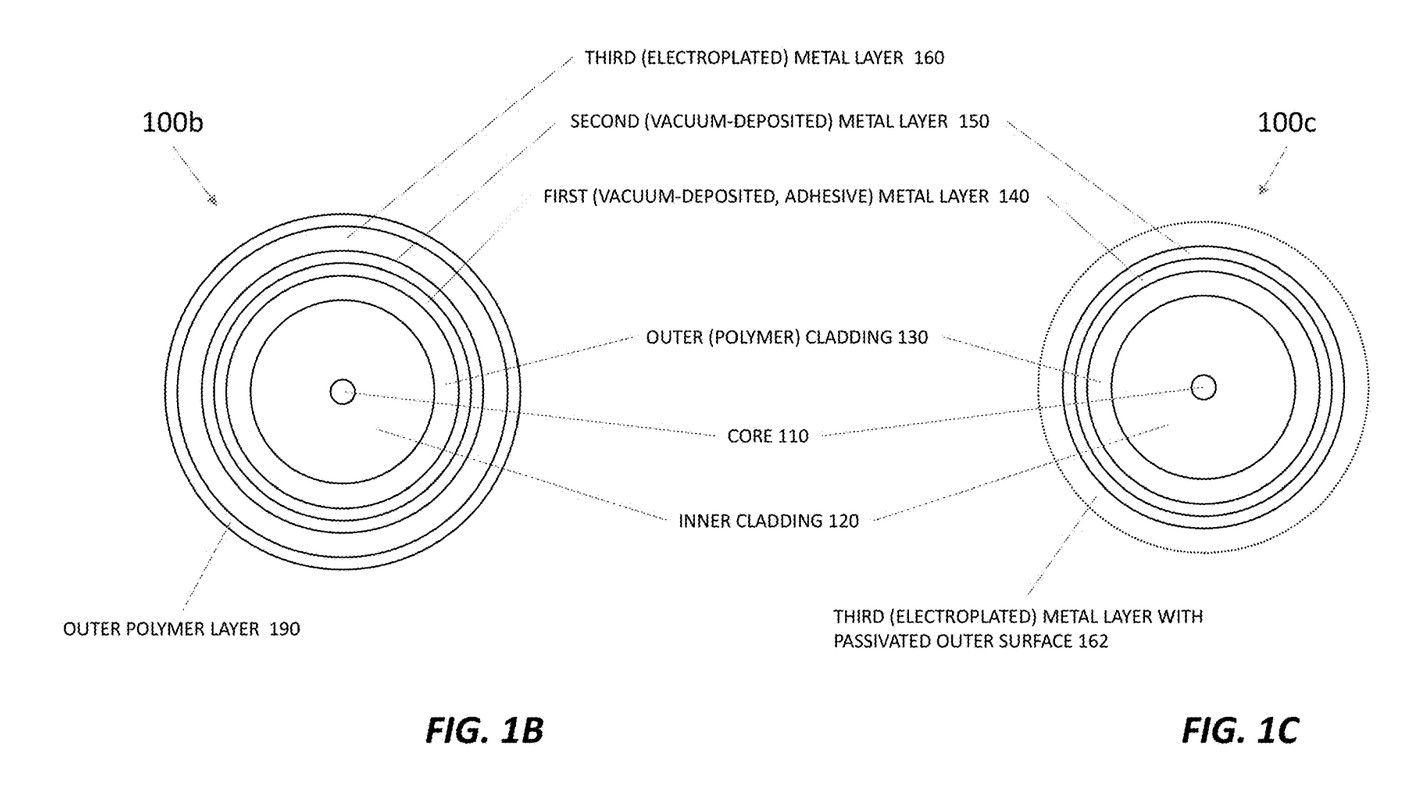
FIG. 1B shows a metallized, polymer-clad optical fiber with a polymer outer layer.
FIG. 1C shows a metallized, polymer-clad optical fiber with a chemically treated outer surface.

FIGS. 1B and 1C show optical fibers 100b and 100c, respectively, with different passivation techniques. In FIG. 1B, the optical fiber 100b includes an outer polymer layer 190 disposed around the third metal layer 160 to protect the third metal layer from oxidation and corrosion. And in FIG. 1C, the optical fiber 100c includes a third metal layer 162 whose outer surface has been treated to prevent or inhibit oxidation or corrosion. For example, if aluminum is used for the third metal layer 162, it can be anodized.

Each of the fibers 100a, 100b, and 100c can be placed in or on a heatsink 102 as shown in FIG. 1A for fiber 100a. The fiber 100a lies in a U-shaped groove in the heatsink 102, with a line contact 104 formed between the fiber 100a and the bottom of the U-shaped groove. (Alternatively, the groove in the heatsink 102 may be in the shape of a V or gothic arch.) The fiber's multi-layer metal coating conducts heat around the periphery of the fiber 100a to the line contact 104. From there, the heat propagates into the heatsink 102 and away from the core 110, inner cladding 120, and polymer outer cladding 130.

Metallizing a Polymer-Clad Optical Fiber

Figure 2:
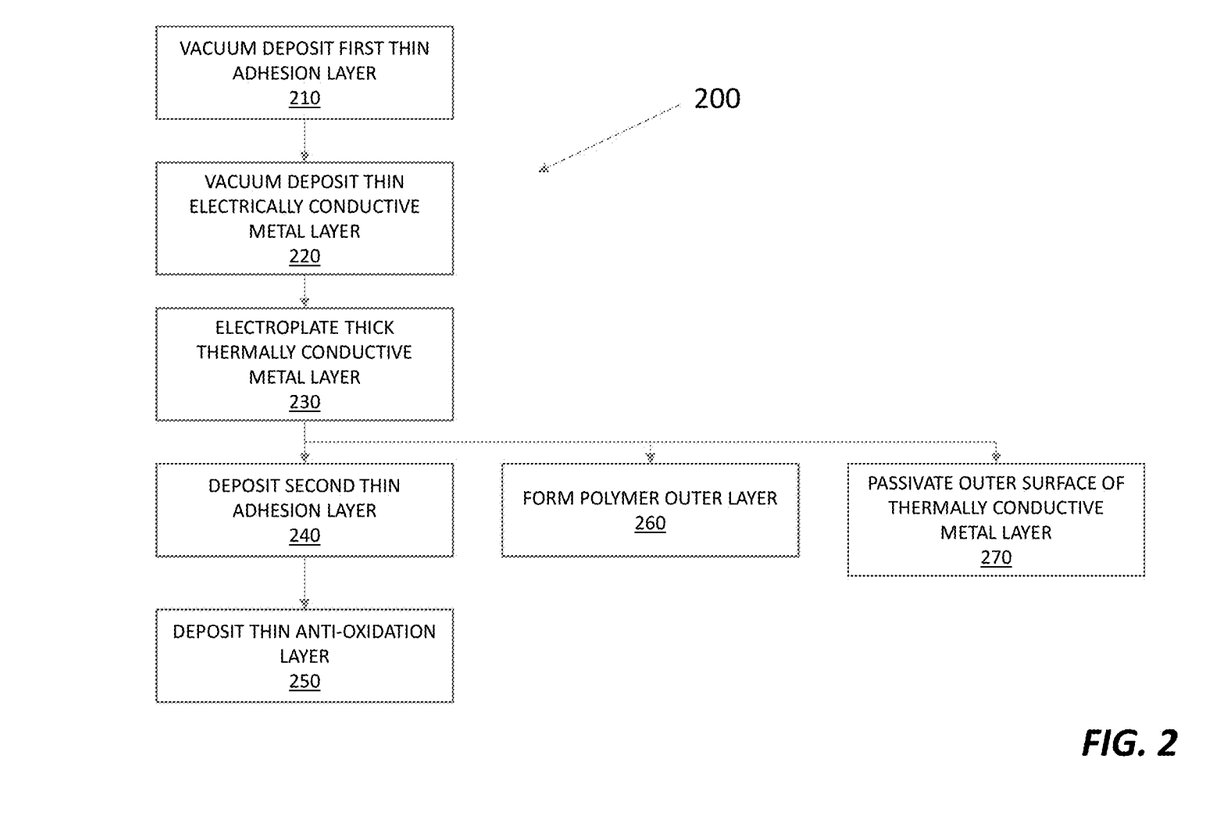
FIG. 2 is a flow chart illustrating a method of making metallized, polymer-clad optical fiber.

FIG. 2 illustrates a method 200 of applying a multi-layer metal coating to a polymer-clad optical fiber. This method 200 is a multistep approach that is amenable to large-scale production. The first step 210 is to apply a very thin layer (e.g., 10s of nm) of metal to the fiber using low-temperature vacuum deposition. This first layer of metal should adhere well to the polymer coating on the fiber and provide a suitable base for the next step. Suitable metals include, but are not limited to be titanium, nickel, and chrome. Because the amount of metal being deposited is very small and the deposition occurs at relatively low temperature, the polymer cladding absorbs little heat from the deposited metal and remains undamaged throughout the deposition process.

This may be followed by a second low-temperature vacuum deposition step 220, this time of a metal with a high electrical conductivity, such as gold. (If a single metal adheres to the fiber and has sufficiently high electrical conductivity, the second vacuum deposition may be omitted.) This metal forms another relatively thin layer (e.g., hundreds of nanometers) on the inner layer of more adhesive metal. It acts as a base layer for electroplating a thicker layer of thermally conductive metal onto the fiber and should therefore be thick enough to prevent a significant voltage drop along the fiber during electroplating. Again, because the amount of metal being deposited is very small and the deposition occurs at relatively low temperature, the polymer cladding absorbs little heat from the deposited metal and remains undamaged throughout the deposition process.

The next step, step 230, is to electroplate the fiber with a high-thermal-conductivity metal to the desired thickness, typically about 10 µm. Copper works well for this application and is easily applied through electroplating. Other metals suitable for electroplating include but are not limited to gold, silver, and aluminum.

If desired, the outer surface of the electroplated metal layer may be passivated with an appropriate chemical treatment or the application of an inert anti-oxidation layer. For instance, another thin layer of adhesive metal, such as chrome, nickel, or titanium, can be vacuum-deposited onto the thick copper layer (step 240). This layer of thin adhesive metal is overplated at step 250 with gold or another suitable material to provide an inert outer surface. Alternatively, the outer surface of the electroplated metal may be chemically treated to prevent or inhibit oxidation or corrosion (step 270). The fiber may also be covered with a protective outer layer, such as a polymer buffer, for protection (step 260).

The method 200 shown in FIG. 2 and described above may be modified as desired. For instance, one or more of the vacuum deposition and electroplating steps may be replaced with an auto-catalytic chemical deposition step, such as electroless nickel, copper, silver, or gold plating. Similarly, some of the deposition steps (and layers) may be omitted. For instance, if gold is electroplated onto the fiber at step 230, then the thin chrome adhesion layer (step 240) and gold anti-oxidation layer (step 250) may be omitted. The layers may also be thicker or thinner as desired. And additional layers, including non-metallic layers, may be deposited as well.

Electroplating Apparatus

Figure 3A:
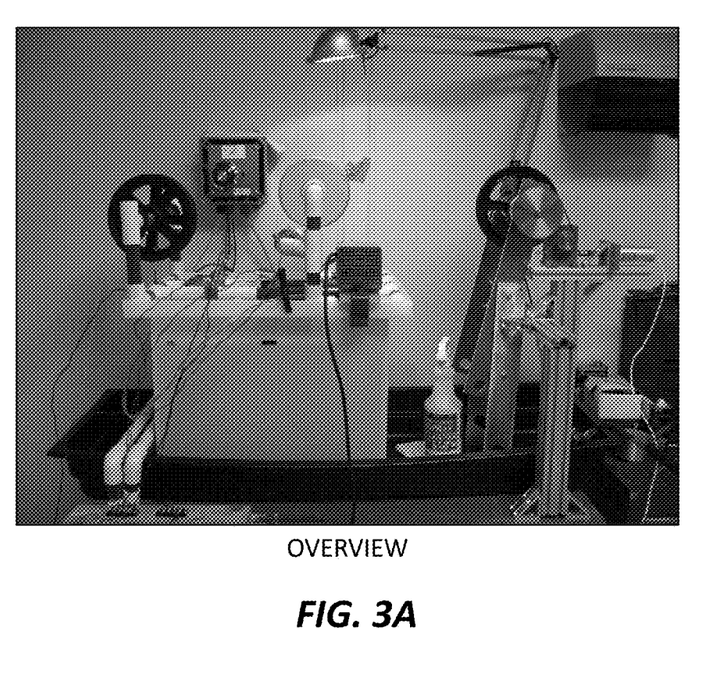
FIGS. 3A and 3B show an apparatus for electroplating polymer-clad optical fiber coated with a base metal layer.
Figure 3B:
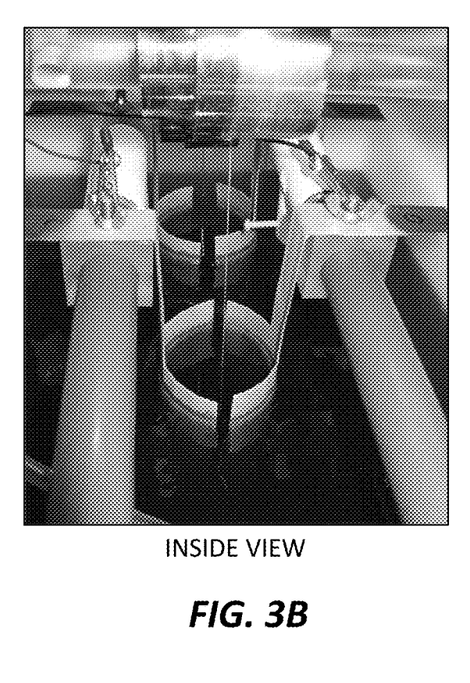

FIGS. 3A and 3B are photographs of an electroplating apparatus for electroplating copper or other conductive material onto a polymer-clad optical fiber as in step 230 of the method 200 illustrated in FIG. 2. The electroplating apparatus includes two spools suspended above a bath filled with an electrolyte solution that includes dissolved metal salts. The fiber is transferred from one spool to the other spool via the electrolyte solution and acts as the cathode. A piece of the metal being plated onto the fiber acts as the anode and is also (partially) immersed in the electrolyte solution. A power supply connected to the anode and the cathode supplies a direct current to the anode, oxidizing the metal atoms in the anode and causing them to dissolve in the solution. At the cathode, the dissolved metal ions in the electrolyte solution are reduced at the interface between the solution and the cathode, causing the metal ions to plate the cathode's outer surface.

Simulated Performance of a Metallized Polymer-Clad Fiber

FIGS. 4A-4F show temperature rises across cross sections of conventional active double-clad fibers with polymer outer claddings and metallized active double-clad fibers with polymer outer claddings used as the gain fiber in high-power amplifiers for different output power levels and at different altitudes. The temperature rises $\Delta T$ are shown with respect to the temperature of the heatsink. Each fiber includes a 25-µm-diameter core with a 400-µm-diameter glass inner cladding and a 560-µm-diameter fluoroacrylate outer cladding. The metalized fibers have 20-µm-thick copper coatings. Each fiber sits in the U-shaped groove of a heatsink. The grooves are 600 µm wide for the conventional fibers and 640 µm wide for the metalized fibers.

Figure 4A:
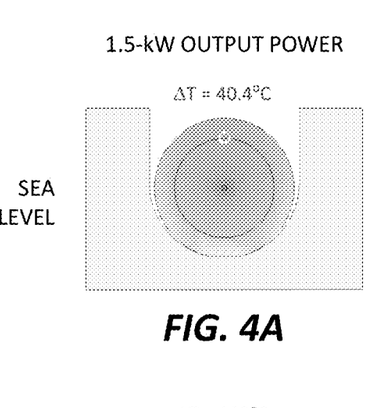
FIGS. 4A, 4B, and 4C show simulated temperature distributions at sea level over the cross-sections of uncoated active polymer-clad optical fiber with 1.5-kW output power, uncoated active polymer-clad optical fiber with 3-kW output power, and metallized active polymer-clad optical fiber with 3-kW output power, respectively.
Figure 4B:
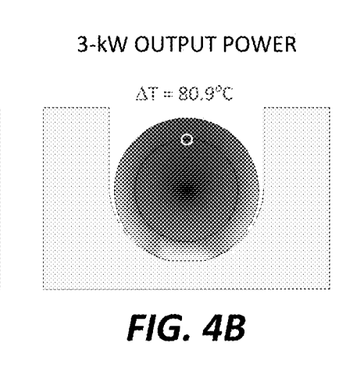
Figure 4C:
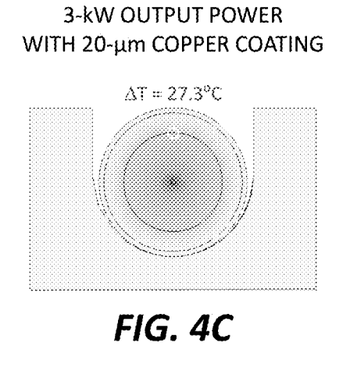
Figure 4D:
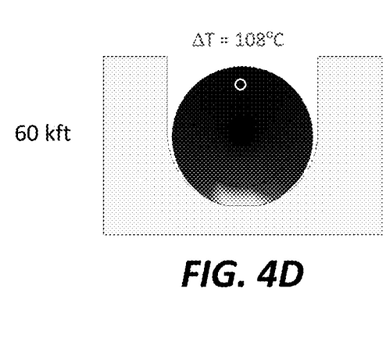
FIGS. 4D, 4E, and 4F show simulated temperature distributions at 60,000 feet over the cross-sections of uncoated active polymer-clad optical fiber with 1.5-kW output power, uncoated active polymer-clad optical fiber with 3-kW output power, and metallized active polymer-clad optical fiber with 3-kW output power, respectively.
Figure 4E:
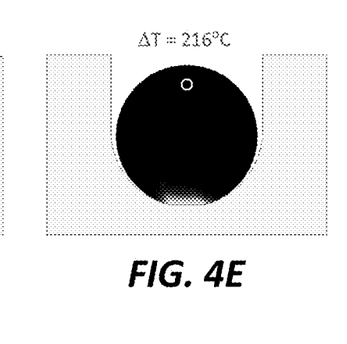
Figure 4F:
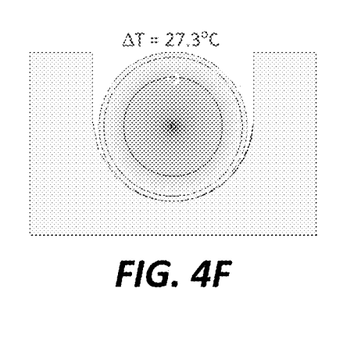

FIGS. 4A, 4B, 4D, and 4E show conventional double-clad fibers, and FIGS. 4C and 4F show metallized double-clad fibers. FIGS. 4A-4C show performance at sea level, and FIGS. 4D-4F show performance at an altitude of 60,000 feet. FIGS. 4A and 4D show optical output power levels of 1.5 kW, and FIGS. 4B, 4C, 4E, and 4F show optical output power levels of 3 kW. The heat deposition is 45 W/m for the 1.5-kW amplifier and 90 W/m for the 3-kW amplifier.

FIGS. 4C and 4F show that the metalized fibers remain cool at both sea level and 60,000 ft, with a temperature difference between the heatsink and the hottest point in the fluoroacrylate cladding of only $\Delta T=27.3°$ C. at 3.0-kW output. In contrast, the temperature difference for the conventional double-clad fiber at sea level and 1.5 kW is $\Delta T=40.4°$ C. and climbs to $\Delta T=216°$ C. at 60,000 ft and 3 kW. Even at sea level, for 3-kW output power the temperature difference for the conventional double-clad fiber is over 80° C., which can result in damage to the polymer cladding if the heatsink temperature is greater than about 0° C.

Figure 5:
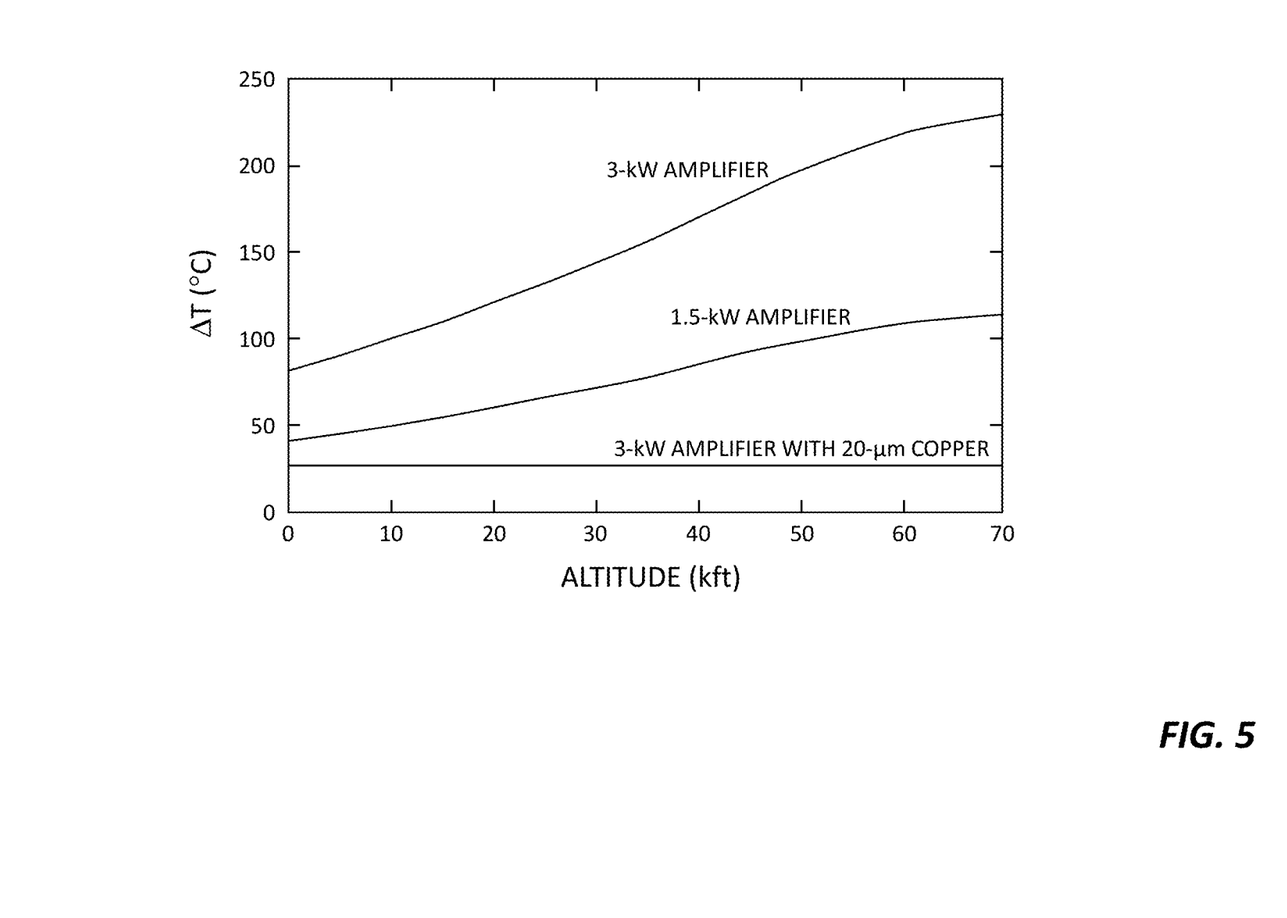
FIG. 5 is a plot of fiber temperature versus altitude for uncoated active polymer-clad optical fiber with 1.5 kW-output power (middle trace), uncoated active polymer-clad optical fiber with 3-kW output power (upper trace), and metallized active polymer-clad optical fiber with 3-kW output power (lower trace).

FIG. 5 is a plot of temperature difference between the heatsink and the hottest point in the fluoroacrylate coating versus altitude for the fibers of FIGS. 4A-4F. Even at 3-kW output power, the metallized fiber's temperature difference stays constant at around 27° C., which keeps the temperature well below the maximum allowable fiber temperature for typical heatsink temperatures. Conversely, the temperature difference for the conventional fiber exceeds 100° C. at an altitude of about 50,000 ft for 1.5-kW output and at an altitude of about 10,000 ft for 3-kW output.

Figure 6A:
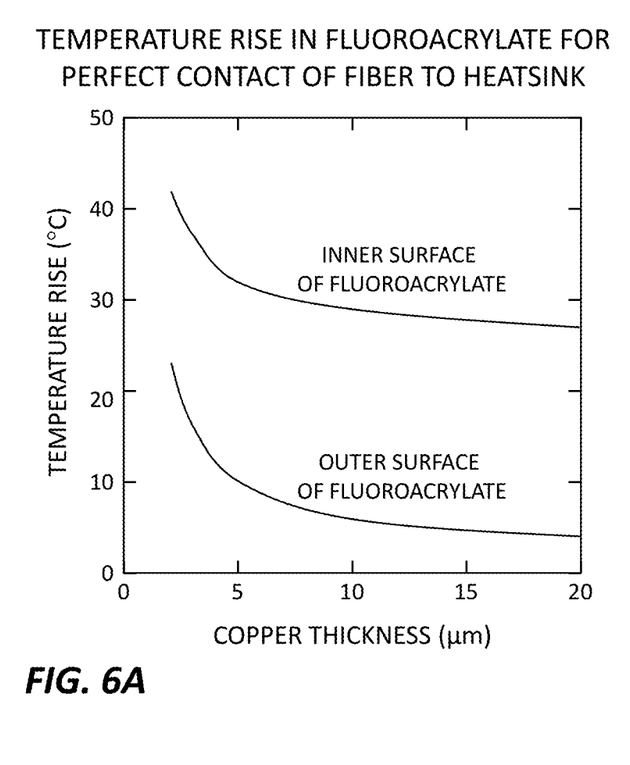
FIG. 6A is a plot of temperature rise versus copper thickness for the inner surface (upper trace) and outer surface (lower trace) of a fluoroacrylate cladding in a metallized active optical fiber.
Figure 6B:
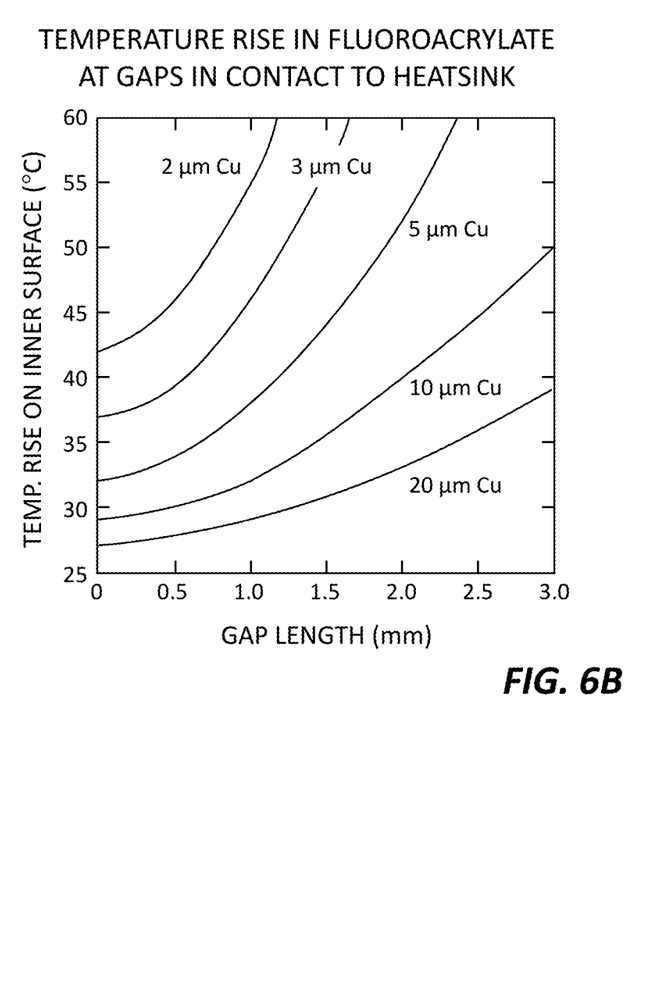
FIG. 6B is a plot of temperature rise versus gap length for the inner surface of a fluoroacrylate cladding in a copper-coated active optical fiber for different thicknesses of copper.

FIGS. 6A and 6B are plots that illustrate the effect of the metal layer thickness on the temperature rise in a fluoroacrylate cladding for a metallized polymer-clad fiber in vacuum. FIG. 6A is a plot of temperature rise versus thickness of copper coating along the hottest section of gain fiber in a 3-kW amplifier, relative to the heatsink, with 90 W/m heat deposition. The upper and lower traces correspond to the hottest temperatures on the inner and outer surfaces, respectively, of the fluoroacrylate cladding. Neither exceeds 40° C., and both drop by over 10° C. as the copper thickness increases from 5 μm to 20 μm. FIG. 6B is a plot of maximum temperature difference at the inner surface of a fluoroacrylate cladding for a metallized polymer-clad fiber versus the length of a gap in the line contact between the fiber and the heatsink for different copper thicknesses. Generally, the temperature increases with gap length. Temperature increases are less severe for thicker copper layers.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical fiber comprising:
   a core;
   an inner cladding disposed about the core;
   an outer cladding disposed about the inner cladding, the outer cladding comprising a polymer; and
   at least one metal layer disposed about the outer cladding, the at least one metal layer comprising metal forming at least one of crystalline structure or a polycrystalline structure surrounding the outer cladding,
   wherein the optical fiber is disposed in contact with a heat sink such that the at least one metal layer forms a line-shaped contact with the heat sink that effectively heatsinks all points on an outer surface of the outer cladding, and
   wherein the at least one metal layer comprises:
   a first metal layer disposed about the outer cladding; and
   a second metal layer disposed about the first metal layer.

2. The optical fiber of claim 1, wherein the core is doped with a rare-earth ion.

3. The optical fiber of claim 1, wherein the polymer comprises a fluoroacrylate.

4. The optical fiber of claim 1, wherein the first metal layer has a thickness of about 10 nm to about 100 nm and the second metal layer has a thickness of about 1 μm to about 100 μm.

5. The optical fiber of claim 1, wherein the first metal layer comprises at least one of chrome, nickel, or titanium and the second metal layer comprises at least one of copper, gold, silver, or aluminum.

6. The optical fiber of claim 1, wherein the first metal layer is vacuum-deposited onto an outer surface of the outer cladding and at least a portion of the second metal layer is electroplated onto an outer surface of the first metal layer.

7. The optical fiber of claim 1, further comprising:
   a third metal layer, disposed about the second metal layer, to prevent at least one of oxidation or corrosion of the second metal layer.

8. The optical fiber of claim 1, wherein the at least one metal layer increases a multimode instability threshold of the optical fiber.

9. The apparatus of claim 1, wherein the optical fiber bridges a gap in the heat sink.

10. The optical fiber of claim 1, wherein the optical fiber comprises a gain medium of an optical amplifier.

11. The optical fiber of claim 1, wherein the optical fiber comprises a gain medium of a laser.

12. A method of metallizing and heatsinking an optical fiber with a polymer outer cladding, the method comprising:
    vacuum depositing a first metal layer onto an outer surface of the polymer outer cladding, the first metal layer adhering to the outer surface of the polymer outer cladding;
    electroplating a second metal layer about the first metal layer; and
    forming a line-shaped contact between an outer surface of the optical fiber and a heat sink that effectively heatsinks all points on the outer surface of the polymer outer cladding via the first metal layer and the second metal layer.

13. The method of claim 12, wherein vacuum depositing the first metal layer comprises vacuum depositing at least one of chrome, nickel, or titanium onto the outer surface of the polymer outer cladding.

14. The method of claim 12, wherein vacuum depositing the first metal layer comprises forming the first metal layer with a thickness of about 10 nm to about 100 nm.

15. The method of claim 12, wherein electroplating the second metal layer comprises depositing at least one of copper, gold, silver, or aluminum onto the outer surface of the first metal layer.

16. The method of claim 12, wherein electroplating the second metal layer comprises forming the second metal layer with a thickness of about 1 μm to about 100 μm.

17. The method of claim 12, further comprising:
    vacuum depositing a third metal layer onto an outer surface of the first metal layer, and
    wherein electroplating the second metal layer comprises forming the second metal layer on an outer surface of the third metal layer.

18. The method of claim 17, wherein vacuum depositing the third metal layer comprises vacuum depositing at least one of copper, gold, silver, or aluminum onto the outer surface of the first metal layer.

19. The method of claim 17, wherein vacuum depositing the third metal layer comprises forming the third metal layer with a thickness of about 100 nm to about 1000 nm.

20. The method of claim 12, further comprising:
    passivating an outer surface of the second metal layer.

21. The method of claim 12, further comprising:
    depositing a layer comprising at least one of chrome, nickel, or titanium onto an outer surface of the second metal layer.

22. The method of claim 12, further comprising:
    forming a polymer outer layer about the second metal layer.

23. The method of claim 12, wherein the polymer outer cladding remains undamaged throughout the deposition process while vacuum depositing the first metal layer onto the outer surface of the polymer outer cladding.

24. An optical fiber comprising:
    a quartz core doped with a rare-earth ion and having a first effective refractive index;
    a quartz cladding disposed about the quartz core and having a second effective refractive index less than the first effective refractive index;
    a fluoroacrylate cladding disposed about the quartz cladding and having a third effective refractive index less than the second effective refractive index;
    a first metal layer disposed about the fluoroacrylate cladding and comprising at least one of chrome, nickel, or titanium; and
    a second metal layer disposed about the first metal layer and comprising at least one of copper, gold, silver, or aluminum,
    wherein an outer surface of the optical fiber forms a line-shaped contact with a heat sink that effectively heatsinks all points on an outer surface of the fluoroacrylate cladding via the first metal layer and the second metal layer.

25. The optical fiber of claim 24, wherein the first metal layer has a thickness of about 1 nm to about 100 nm and the second metal layer has a thickness of about 1 μm to about 100 μm.

26. The optical fiber of claim 25, further comprising a third metal layer disposed about the second metal layer to prevent at least one of oxidation or corrosion of the second metal layer.

27. An optical fiber comprising:
a core;
an inner cladding disposed about the core;
an outer cladding disposed about the inner cladding, the outer cladding comprising a polymer;
a first metal layer disposed about the outer cladding, the first metal layer consisting of a single metallic element; and
a second metal layer disposed about the first metal layer,
wherein the optical fiber is disposed in contact with a heat sink such that an outer surface of optical fiber forms a line-shaped contact with the heat sink that effectively heatsinks all points on an outer surface of the outer cladding.

28. An optical fiber comprising:
a core;
an inner cladding disposed about the core;
an outer cladding disposed about the inner cladding, the outer cladding comprising a polymer;
a first metal layer disposed about the outer cladding and formed by vacuum depositing metal onto an outer surface of the polymer; and
a second metal layer disposed about the first metal layer,
wherein the optical fiber is disposed in contact with a heat sink such that an outer surface of optical fiber forms a line-shaped contact with the heat sink that effectively heatsinks all points on an outer surface of the outer cladding via the metal layer.

* * * * *